United States Patent [19]

Leopold, Jr. et al.

[11] 3,802,661

[45] Apr. 9, 1974

[54] ROTARY VALVE WITH ANTI-CORROSION AND TORQUE CONTROLLING MEANS

[75] Inventors: Wilbur R. Leopold, Jr., Decatur; William L. Hauffe, Warrensburg, both of Ill.

[73] Assignee: Mueller Co., Decatur, Ill.

[22] Filed: July 6, 1972

[21] Appl. No.: 269,295

[52] U.S. Cl. ............................. 251/297, 251/309
[51] Int. Cl. .......................... F16k 5/04, F16k 41/00
[58] Field of Search ........... 251/297, 172, 173, 214, 251/308, 309, 315, 312; 277/32, 205, 206

[56] References Cited
UNITED STATES PATENTS

| | | | |
|---|---|---|---|
| 3,095,177 | 6/1963 | Muller | 251/173 |
| 3,350,057 | 10/1967 | Luckenbill | 251/312 |
| 3,563,512 | 2/1971 | Hauffe | 251/312 |
| 3,602,340 | 8/1971 | Budzich | 251/297 X |
| 3,384,337 | 5/1968 | Brown | 251/315 X |
| 3,190,702 | 6/1965 | Flick | 277/205 X |
| 2,997,318 | 8/1961 | Lansky et al. | 277/205 X |
| 3,589,676 | 6/1971 | Erickson | 251/172 |

Primary Examiner—William R. Cline
Assistant Examiner—Ira S. Lazarus
Attorney, Agent, or Firm—Cushman, Darby & Cushman

[57] ABSTRACT

A rotary valve assembly of the "soft seat" type for use in fluid distribution systems such as gas or water. The valve assembly includes a valve housing having a fluid passage therethrough and a rotary valve structure including a valve operating member or stem extending exteriorly of the housing and a valve member for cooperating with valve seat means in the flow passage. Means are provided between the valve stem and the wall of the bore through which the valve stem extends for applying a controlled torque sufficient to render the valve structure inoperative by hand. Additionally, the torque controlling means prevents ingress of fluid or abrasive material to the interior of the valve assembly and also prevents corrosion between the valve stem and valve housing.

12 Claims, 7 Drawing Figures

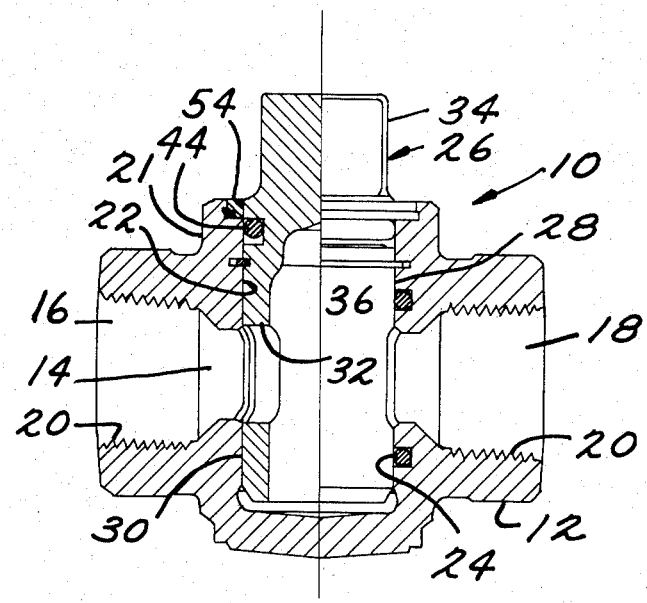
FIG. 1
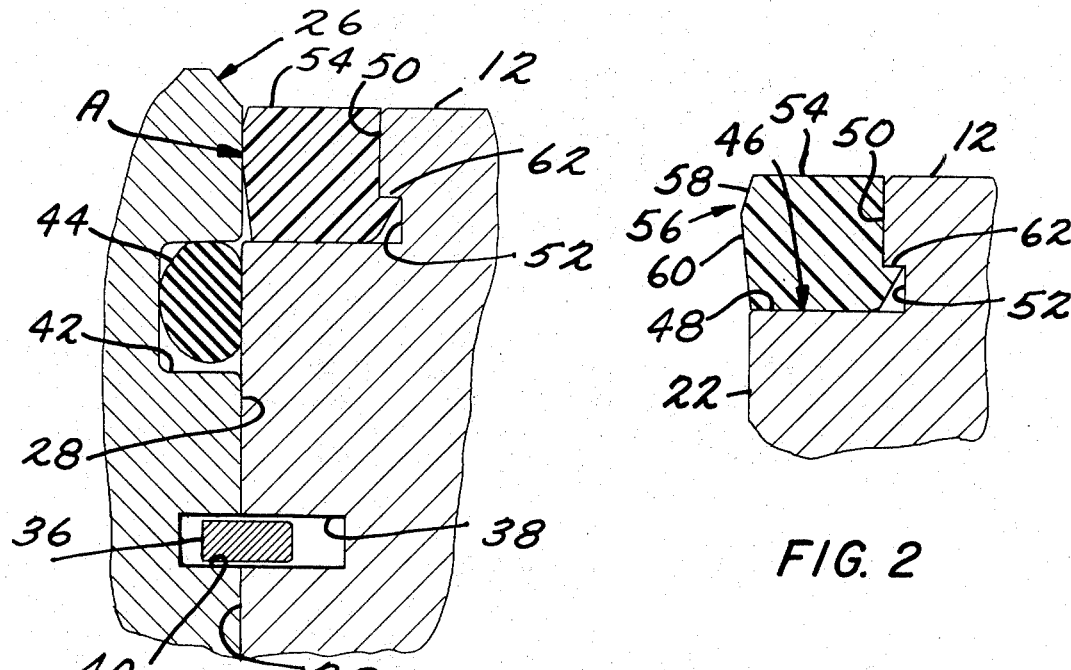
FIG. 3
FIG. 2

ROTARY VALVE WITH ANTI-CORROSION AND TORQUE CONTROLLING MEANS

The present invention relates generally to improvements in rotary valves of the type used in fluid distribution systems where it is desirous the valve cannot be operated by people without the use of a tool. Valve assemblies of the type contemplated in the present invention are commonly used in supply lines for commercial or domestic gas or for water, the same being connected into the line ahead of the meter.

BACKGROUND OF THE INVENTION

In the past, valve assemblies used in fluid distribution systems, such as gas and water, have been of the type known as "ground key" stops. In this type of valve assembly, the valve housing is provided with a flow passage therethrough having a valve seat intermediate the inlet and outlet of the flow passage and a bore communicating with the valve seat from the exterior of the housing. The valve member which was commonly referred to as a key was usually in the shape of a plug and it was ground to fit the particular valve seat in a particular housing. The ground key type of rotary valve assembly which complies with standards for sealing cannot be operated by hand but requires the use of a wrench or other tool to overcome starting torque and then turning torque. For example, a ¾ inch valve assembly usually has a starting or breakaway torque in the range of 250 to 500 inch-pounds and a turning torque in the range of 125 to 250 inch-pounds. Other size valve assemblies of the ground key type both smaller and larger have starting and turning torque ranges too high for operation by hand. There was never any problem of children or for that matter of unauthorized adults operating these valves unless they actually had a tool. The gas companies insist upon such an arrangement so as to avoid improper operation of the valves and thus eliminate as much as possible dangerous situations, such as unauthorized persons turning the valve off and then turning it on without relighting of pilot lights.

In recent years efforts have been made to design other types of valve assemblies for use in fluid distribution systems which could meet the standards set by the industry for positive sealing capacity throughout the expected operating range of temperatures, longevity and the like. In this respect, the efforts by the manufacturers have been to get away from the operation of grinding the valve member to fit a particular valve seat and the results have been the invention of what is known in the industry as a "soft seated" valve. These soft seated rotary valves have in most instances been a plug type of valve with an O-ring seal carried on the plug or carried in the valve housing and surrounding either the inlet or outlet of the flow passage. Other types of soft seated rotary valves have been the type utilizing a ball cooperating with annular seats between the ball and the flow passage in the housing. A third type of soft seated valve has been the type wherein a cylindrical roller made of a resilient material is carried on a valve operating element and adapted to cooperate with the port or ports of the flow passage through the valve housing.

The above described soft seated rotary valves, while capable of meeting the standards set by the fluid distribution industry with regard to sealing pressures, longevity and the like have had one disadvantage, namely, they have been too easy to operate and, in fact, can be operated by hand. Because of this disadvantage, soft seated valves have not been overwhelmingly accepted by the gas and water industry even though these valves are inexpensive to manufacture. These valves with low torque characteristics can only be used in a controlled situation where it is impossible for unauthorized personnel to get to them.

Prior art arrangements of soft seated rotary valves and of valves which are related to the present invention may be found in the following patents.

| NUMBER | NAME | DATE |
| --- | --- | --- |
| 3,343,803 | Burke | Sept. 26, 1967 |
| 3,350,057 | Luckenbill | Oct. 31, 1967 |
| 3,437,106 | Mueller et al. | Apr. 8, 1969 |
| 3,563,512 | Hauffe | Feb. 16, 1971 |

BRIEF SUMMARY OF THE INVENTION

The present invention relates to rotary valve assemblies comprising a valve housing having a flow passage therethrough with a chamber intermediate the ends of the flow passage, the chamber providing a valve seat means and communicating with a bore open to the exterior; and a valve structure including a valve stem rotatable in the bore and a valve member cooperating with valve seat means in the chamber. The valve assembly is of the soft seated type of valve which requires very little torque to operate. The present invention in more detail relates to means for applying a controlled torque to the valve stem which is sufficient to prevent the valve assembly from being opened or closed by hand. In order words, the break-loose torque and turning torque applied by the torque controlling means is at least great enough to require the use of a wrench or other tool to operate the valve assembly.

Normally ¾ inch soft seated type of rotary valves have a breakloose torque of only 10 to 15 inch-pounds and a turning torque in the order of 5 inch-pounds. Such a valve assembly can be operated by hand and this feature is very undesirable when the valve assemblies are used in fluid distribution systems wherein the fluid used may be dangerous if not properly controlled. It has been found that the breakloose torque in a soft seated valve assembly must be raised considerably above the aforementioned values so that the valve cannot be operated by hand. Consequently, it is the object of the present invention to provide a controlled torque in a rotary valve assembly which is substantially less than the torque required to operate a ground key rotary valve assembly but still high enough to prevent operation of the valve assembly without the use of a wrench or other tool.

The means for controlling the torque in the valve assembly of the present invention also functions to prevent moisture and/or foreign matter from entering the area between the stem and the body as well as functioning to prevent corrosion from a bridging between the valve stem and valve housing.

The torque controlling means comprises an annular ring made of a resilient, yieldable material and positioned in a groove between the valve stem and the valve housing at the outer end of the valve stem bore. The annular ring is specifically dimensioned with respect to the groove between the wall of the bore in the valve housing so as to provide the increase in torque to the desired amount and it is positioned outwardly of the conventional sealing means between the valve stem and housing and thus protects the sealing means from foreign matter and prevents corrosion between the valve stem and valve housing.

DETAILED DESCRIPTION OF THE DRAWINGS

FIG. 1 is a vertical sectional view of a rotary valve assembly embodying the present invention, the view showing the valve structure, namely the plug partly in elevation;

FIG. 2 is an enlarged fragmentary sectional view of the torque controlling ring in position in the valve housing prior to insertion of the valve structure into the valve housing;

FIG. 3 is an enlarged fragmentary sectional view similar to FIG. 2 but illustrating the valve structure or plug inserted into the valve housing;

Figure 4:
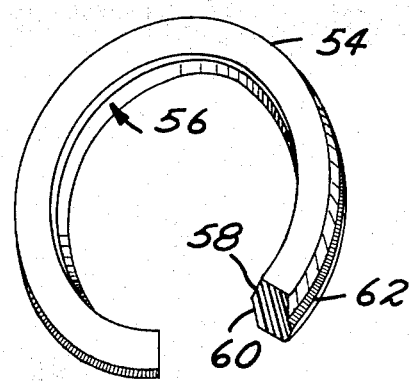
FIG. 4 is a perspective view of the torque controlling ring with a portion of the ring broken away.
Figure 6:
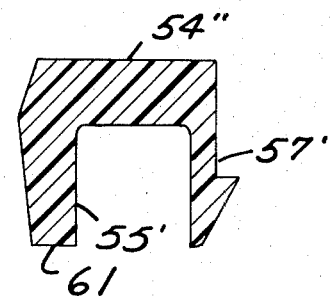
Figure 5:
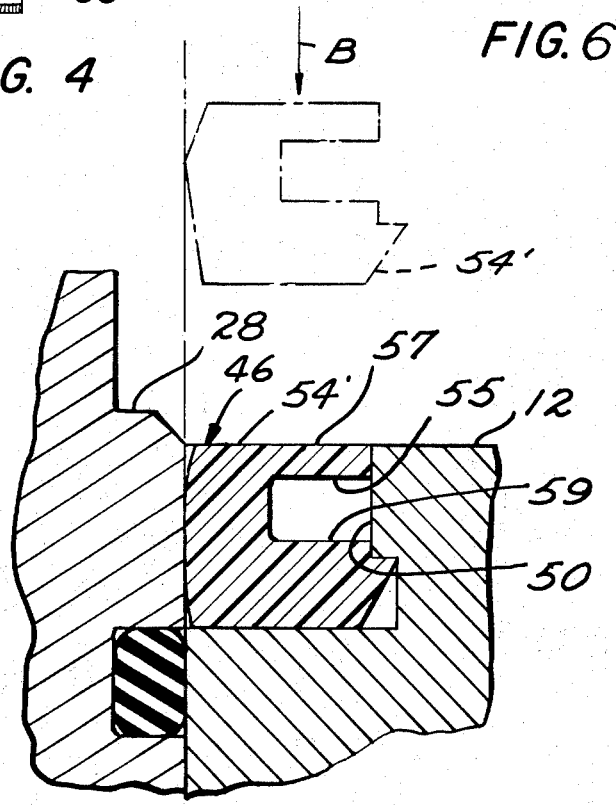
Figure 7:
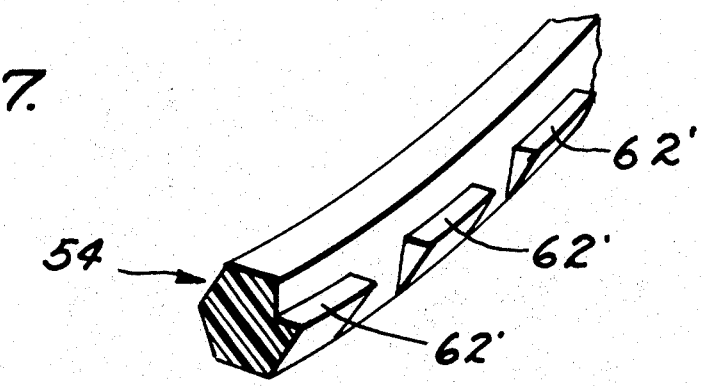

FIG. 5 is an enlarged fragmentary sectional view of another embodiment of the present invention, the view illustrating in dot-dash lines the insertion of the torque controlling ring after the valve structure has been inserted into the valve housing; and FIG. 6 is a radial sectional view of a still further embodiment of the torque controlling ring of the present invention, FIG. 7 is an enlarged fragmentary perspective view showing a modified stop means for retaining the ring against axial displacement.

DETAILED DESCRIPTION OF THE INVENTION

Referring now to the drawings, wherein like character or reference numerals represent like or similar parts and in particular to FIGS. 1 through 4 inclusive, there is shown a rotary valve assembly generally designated at 10 and having a valve housing member or body 12 with a flow passage 14 therethrough. One end of the flow passage 14 defines an inlet end portion 16 for the valve assembly, whereas the other endof the flow passage 14 defines an outlet end portion 18. The inlet and outlet end portions 16 and 18 are respectively threaded as indicated at 20 for receiving the threaded ends of fluid lines (not shown). The valve housing member 12 is provided with a generally cylindrical extension 21 through which extends a bore 22, the bore opening to the flow passage 14 intermediate the inlet and outlet end portions 16 and 18, respectively. At the portion where the bore opens to the flow passage it will be defined for the purpose of this description as a chamber providiing a valve seat 24 in the form of an O-ring surrounding at least one of the ports of the inlet and outlet end portions 16 and 18.

Inserted into the bore 22 is a unitary valve structure 26 of the plug type and having a stem portion 28 and a valve member portion 30 with the flow-way 32 therethrough. A flattened noncircular head 34 of the valve stem portion 28 extends outwardly of the valve housing member 12 and is capable of receiving a wrench in order to turn or rotate the valve structure to open and close the flow passage 14 in valve housing member 12.

The valve assembly 10 briefly described above and which utilizes the present invention, is disclosed in detail in the aforementioned U.S. Pat. No. 3,563,512 and is one type of soft seated rotary valve assembly to which the present invention may be incorporated.

Other types of soft seated rotary valve assemblies are disclosed in detail in the aforementioned U.S. Pat. Nos. 3,343,803, 3,350,057 and 3,437,106 and in the copending U.S. application Ser. No. 32,708, filed Apr. 28, 1970 by Hauffe et al and entitled "Soft Seated Rotary Valve" and now U.S. Pat. No. 3,684,242 issued Aug. 15, 1972. Also, it is within the scope of the present invention to utilize the same with valves other than soft seated valves such as "butterfly" type valves, eccentric plug valves and the like.

As shown in FIGS. 1 and 3, the unitary valve structure 26 i.e. the valve stem 28 and valve member 30, is retained in the valve housing member 12 by means of a split snapring 36 carried in matching annular grooves 38 and 40 provided in the valve housing member 12 and the valve stem 28 respectively. The valve stem 28 is provided with another annular groove 42 in which is positioned an O-ring seal 44 for sealing the interior of the valve assembly 10 from the exterior.

In the open upper end of the bore 22 there is provided an annular groove 46, the groove 46 having an outwardly facing wall 48 and a second wall 50 coaxial with respect to the bore 22. The second coaxial wall 50 is undercut at its inner end as indicated at 52 by an annular counter-bore.

An annular torque controlling ring 54 made of a resilient, yieldable material is positioned in the groove 46 as shown in FIG. 2. In more detail the torque controlling ring 54 has an inner peripheral wall 56 defined by two wall portions 58 and 60 at least one of which diverges outwardly away from the axis of the ring 54. The relaxed radial thickness of the ring 54, at least at the point where the wall portions 58 and 60 join each other, is greater than the radial thickness of the groove 46 and thus, when the ring 54 is assembled in the valve housing member 12 with the valve structure 26 in place, the ring 54 will deform in the area marked A in FIG. 3 and will apply a friction on the valve stem 28 to produce the necessary torque to make the valve assembly 10 operable only by the use of a tool.

The annular torque controlling ring 54 is provided with stop means defined by an annular radially extending lip 62 or a series of radially extending circumferentially spaced lips or protrusions 62' (FIG. 7) on its lower end which is adapted to be received in the undercut portion 52 and thus prevent axial movement of the ring relative to the housing member 12 when installed therein. The annular lip 62 and spaced protrusions are frusto-conical in shape so that when the ring 54 is inserted into the groove 46 of the valve housing member 12, the frusto-conical surface will cam on the wall 50 until the annular lip or spaced protrusions, as the case may be, is adjacent with the counter bore or undercut portion 52 at which time its resiliency causes it to spring back into the undercut portion.

The valve assembly 10 shown in FIGS. 1 through 4 inclusive is assembled by first assembling the torque controlling ring 54 in the groove 46 of the valve housing member 12. When this is done by forcing the ring 54 axial into the groove, then the valve structure 26 is inserted axially into the bore 22 until it reaches the portion where the split snapring 36 will extend partially into each of the grooves 38 and 40. The valve assembly once assembled as described above cannot be taken apart.

The material used for the torque controlling ring 54 is any material whether natural or synthetic which is resilient and yieldable so that it can deform under the urging of the valve stem in a pressure relationship thereto resulting in a friction to produce a torque on the stem. Preferably the material is a plastic material which is semi-rigid, resilient and yieldable and having a modulus at least as great as that of a low molecular weight, high pressure polyethylene. For example, a polyolefin such as polyethylene, polypropylene, polybutene and polypentene may be used. However, other conventional synthetic polymeric materials having a modulus, as defined, can be used such as polyurethane, plasticized polyvinylchloride or polyvinylidene chloride or combinations thereof, polyamides (e.g. conventional nylons) polyacetals, polyesters (Dacron, Orlon), polysiloxane and polysilicon rubbers, polysulfide rubbers and halogenated rubbers such as polychloroprene.

FIGS. 5 and 6 disclose other embodiments of the present invention but, in these embodiments, the torque controlling ring is inserted into the valve assembly after the valve structure i.e., valve member and valve stem, has been assembled in the bore of the valve housing member. In more detail, the torque controlling ring 54' of FIG. 5 is provided with a peripheral annular groove 55 thus providing two legs 57 and 59 engaging the wall 50. As shown in FIG. 5, the valve stem 28 is assembled in the valve housing member 12 and then the ring 54' is moved axially in the direction of the area B down into the groove 46. The leg 59 is flexed upwardly by the wall 50 as the ring 54' moves downwardly and it then snaps into the undercut groove 52. A detailed description of this embodiment of the invention will be found in the co-pending application of Wilbur R. Leopold, Ser. No. 269,293 filed concurrently herewith and entitled "Rotary Valve With Anti-Corrosion and Torque Controlling Means". FIG. 6 which is a still further embodiment of the present invention, discloses a torque controlling ring 54'' which has an annular groove 55' in its bottom wall 61. This ring 54'' is assembled into the valve assembly in a similar manner to the ring shown in FIG. 5 except its leg 57' is flexed inwardly by the wall 50 of the groove 46. A detailed description of this embodiment of the invention is found in the co-pending application of Frank C. Hackman, Ser. No. 269,294 and filed concurrently herewith and entitled "Rotary Valve With Anti-Corrosion and Torque Controlling Means".

The terminology used throughout the specification is for the purpose of description and not limitation, the scope of the invention being defined in the claims.

What is claimed is:

1. A soft-seated rotary valve assembly comprising:
   a valve housing having a flow passage therethrough with an inlet and an outlet; said housing further including a chamber defining valve seat means intermediate the inlet and outlet of said flow passage and a bore having one end portion open to the exterior of the housing and another end portion open to said chamber, said bore at its opening to the exterior of the housing being provided with a first groove, said groove having an outwardly facing first wall and a second wall coaxial of said bore, said coaxial wall being undercut at its inner end adjacent to said first wall to define a second groove;

a valve structure including a valve stem extending through and rotatable in the said bore and a valve member cooperating with said valve seat means and operatively carried on said valve stem and movable to open and close said flow passage;

means to retain said valve stem against axial movement relative to said housing member;

means spaced inwardly of the opening of said bore to the exterior of said housing for providing a seal between said stem and said bore; and means outwardly of said sealing means and between said valve stem and said bore for applying a controlled torque on said valve structure sufficient to render said structure inoperative by hand, said torque controlling means also preventing ingress of fluid and/or abrasive material and preventing corrosion of said valve stem and said housing outwardly of said sealing means, said last mentioned torque controlling means including an annular ring made of a semi-rigid resilient and yieldable material, said annular ring being positioned in said first groove and having a radially extending stop means on its lower end which is received in said second groove to prevent axial movement, said ring having a radial thickness along at least one radius thereof, slightly greater than the radial distance between said coaxial wall and said valve stem whereby said ring is deformed when in position to thereby provide a friction produced controlled torque on said stem.

2. A rotary valve assembly as claimed in claim 1 in which said annular ring has an inner wall defined by at least two wall sections, at least one said wall section diverging from an intermediate point on the same away from the ring axis.

3. A rotary valve assembly as claimed in claim 2 in which said stop means is an annular lip, said lip being frusto-conical to provide a cam surface when said ring is installed.

4. A rotary valve assembly as claimed in claim 3 in which said annular ring is made from a plastic material or rubber.

5. A rotary valve assembly as claimed in claim 4 in which said plastic material is polypropylene.

6. A rotary valve assembly as claimed in claim 3 wherein said annular ring is substantially solid in radial section.

7. A rotary valve assembly as claimed in claim 1 in which said torque controlling means is installed in said groove in said housing prior to installation of said valve structure into said bore.

8. A rotary valve assembly as claimed in claim 2 in which said stop means includes a plurality of circumferentially spaced protrusions having camming surfaces thereon.

9. A soft-seated rotary valve assembly comprising:
   a valve housing having a flow passage therethrough with an inlet and an outlet;
   said housing further including a chamber defining valve seat means intermediate the inlet and outlet of said flow passage and a bore communicating with said chamber and open to the exterior of the housing;
   a valve structure including a valve stem extending through and rotatable in said bore and a valve member cooperating with said valve seat means and operatively carried on said valve stem and movable to open and close said flow passage;

means to retain said valve stem against axial movement relative to said housing member;

means spaced inwardly of the opening of said bore to the exterior of said housing for providing a seal between said steam and said bore;

an annular groove provided between said valve stem and said bore at its opening to the exterior of said housing, said groove being provided with an annular undercut portion spaced inwardly of its outer open end; and means outwardly of said sealing means and positioned in said annular groove between said valve stem and said bore for applying a controlled torque on said valve structure sufficent to render said structure inoperative by hand, said torque controlling means also preventing ingress of fluid and/or abrasive material and preventing corrosion between said valve stem and said housing outwardly of said sealing means, said last-mentioned means including an annular ring positioned in said groove and having a radial thickness along at least radius thereof slightly greater than the radial thickness of said groove, said annular ring having a radially projecting stop means received in said undercut portion of said groove for preventing axial movement of said annular ring relative to said housing, and said annular ring being made of a semi-rigid resilient and yieldable material deformable under the urging of the stem and housing to provide a friction-produced controlled torque on said stem.

10. A rotary valve assembly as claimed in claim 9 in which said annular ring is made of a plastic material.

11. A rotary valve assembly as claimed in claim 10 in which said plastic material is a polyamide.

12. A rotary valve assembly as claimed in claim 10 in which said plastic material is nylon.

* * * * *

Disclaimer 3,802,661.—*Wilbur R. Leopold, Jr.*, Decatur, and *William L. Hauffe*, Warrensburg, Ill. ROTARY VALVE WITH ANTI-CORROSION AND TORQUE CONTROLLING MEANS. Patent dated Apr. 9, 1974. Disclaimer filed Apr. 25, 1974, by the assignee, *Mueller Co.*

Hereby disclaims the portion of the term of the patent subsequent to Mar. 26, 1991.

[*Official Gazette August 27, 1974.*]